2 Sheets--Sheet 1.
A. BOND.
Apparatus for Pisciculture.
No. 160,002. Patented Feb. 23, 1875.
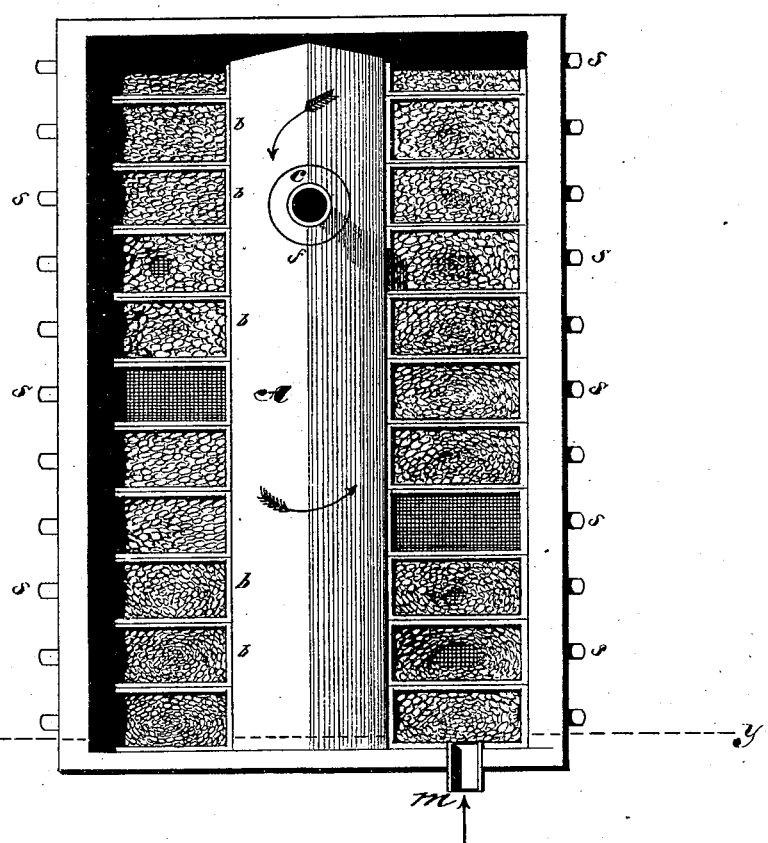
Fig I.
Fig II.
Witnesses
Inventor
Amos Bond
by his Att'ys
Gardiner & Hyde
THE GRAPHIC CO.PHOTO-LITH.39 & 41 PARK PLACE,N.Y.

2 Sheets--Sheet 2.
A. BOND.
Apparatus for Pisciculture.
No. 160,002. Patented Feb. 23, 1875.
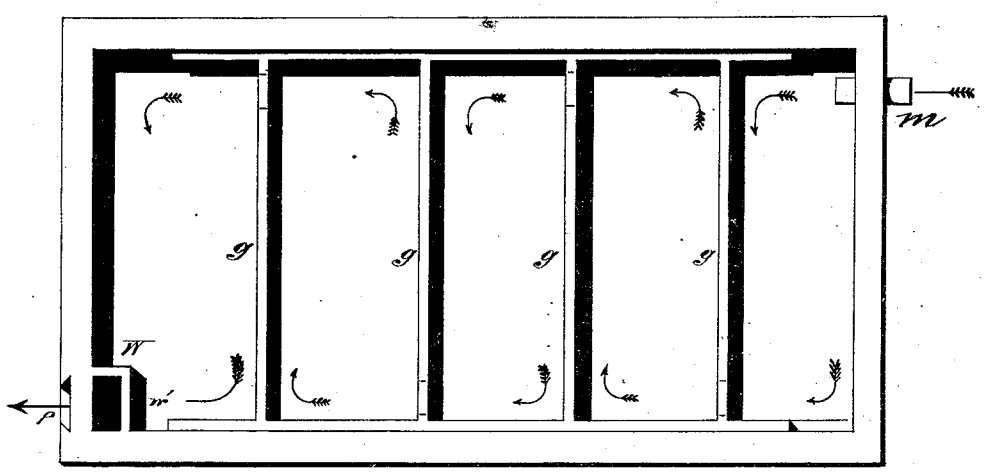
*Fig III*
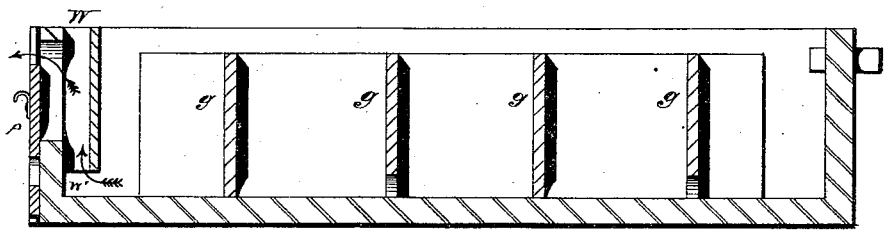
*Fig IIII*
Witnesses
E. Dudley Chapin.
C. A. ———
Inventor
Amos Bond
by his Atty.s
Gardiner & Hyde
THE GRAPHIC CO. PHOTO-LITH. 39 & 41 PARK PLACE, N.Y.

UNITED STATES PATENT OFFICE.

AMOS BOND, OF VERNON, CONNECTICUT.

IMPROVEMENT IN APPARATUS FOR PISCICULTURE.

Specification forming part of Letters Patent No. 160,002, dated February 23, 1875; application filed May 28, 1874.

*To all whom it may concern:*

Be it known that I, AMOS BOND, of Vernon, Tolland county, State of Connecticut, have invented certain Improvements in the Construction of Fish-Nurseries, of which the following is a specification:

The first part of my invention consists generally in the construction and arrangement of the parts of a vat having for their object the collection and preservation of the spawn under the most favorable conditions for its impregnation, the delivery of it at the proper time from the outside of the vat, the production of a current throughout all parts of the water contained in the vat, and the lining of the vat to prevent the growth of vegetation as well as disinfect the water from decayed matter passing into it.

The second part of my invention consists in a device by which the current is made to pass in its full strength over every part of the vat to sweep it of accumulated trash or keep it free from the same.

In the drawings, Figure I is a plan view of a vat or nursery having my improvements. Fig. II is a vertical section on the line $x\,y$. Fig. III is a plan view, and Fig. IV a section.

Arranged upon the bottom of the vat A, and immediately beneath the sieves $b$, containing the cobble-stones or gravel, are the compartments B for the reception of the spawn. These compartments may be arranged upon any part of the bottom of the vat or beneath the vat, so as to communicate through its bottom with the vat, and they have their tops dished or in the form of a shallow funnel, through the bottom of which is an opening communicating with their interior, so that the spawn and milt of the fish finding their way through the gravel-sieves above are conducted by the sloping sides and brought together in the interior of the compartment B. From the compartment B the pipe $s$ is conducted to the outside of the vat to a point a little above the usual water-level in the same. (This is shown in Fig. II.)

By this construction of receptacle for the spawn, arranged beneath the gravel-sieve, the spawn and milt are conducted to remain together undisturbed upon its bottom, having many advantages over the ordinary one of catching the spawn upon a fine sieve beneath the gravel one, as in the latter method the milt passes through the fine one from the upper sieve, and fails to impregnate many of the eggs.

By raising the water in the vat to a higher level than the mouths of the tubes S, a current is induced through the openings in the tops of compartments B to pass through the compartments themselves and up through tubes S, to take with it and deliver the spawn in the compartments out of the mouths of the tubes, and this current can be varied in strength at will by the regulation of the height of water in the vat.

In order to cause the current of water feeding the vat to be conducted through all of the extent of the vat, I place away from the walls, and conveniently near the center of the vat, the overflow-pipe C, and as the feed-current $m$ comes in at one side or end of the vat, it sweeps entirely around its interior before finally escaping through pipe C, and a miniature whirlpool is produced that causes all of the water within the vat to be in motion, which would not be the case were the water introduced at one side to pass out at another, or through the bottom of the vat to pass out at any of the sides; and in order that the depth of water in the vat may be governed so that the spawn can be delivered, when desired, through tube S, I form the overflow-pipe C in sections, as shown in Fig. II, the part $c'$ being a sleeve fitting over and sliding upon the part $a$, so that the strength of the current through the compartments B and through tubes S will be in proportion to the elevation of mouth of tube C above the level of the mouths of tubes S.

The overflow-pipe C may be withdrawn from the bottom of the vat to permit the water to be entirely drawn off from the vat through the opening thus left, and for a purpose hereinafter described, and I surround the pipe C with a sieve or lattice, $f$, to prevent the escape of fish.

Although the compartments B may be placed with the gravel-sieves at any part upon or in the bottom of the vat, and the tubes S conducted therefrom, I prefer for convenience of access to the sieves $b$ to arrange them against two of the sides of the vat, and arrange upon the vat a removable shed, to slope toward the sieves, and in the ends of the sieves toward this shed cut openings, or else have the sides of the sieves below the shed, so that spawn in any part of the vat will be saved by being conducted to the sieves.

My vat I line with sheet metal, for which purpose I prefer zinc, and coat it with gas-tar. The gas-tar not only perfectly protects the metal from oxidization, but prevents the growth of fungus or other vegetable matter within the vat, and disinfects and purifies all water coming into it.

In order to compel the current feeding a fish pond or vat to sweep with its whole force the bottom to remove all trash, I arrange across the pond or vat—the shed, the compartments B, and sieves $b$ being previously removed, and the overflow-pipe C withdrawn, and the opening thus left in the bottom closed—a series of partitions, $g\ g\ g$, &c., which conform to and rest against the bottom, and have their tops in the same horizontal plane, and the water being reduced in the vat so as not to overflow the partitions, is compelled to flow through an opening in the bottom and at the end of one partition, and through the bottom and opposite end of the next one, and so on alternately until it is carried out through the wall of the vat in an aperture placed diagonally to the opening in the nearest partition. This is shown in Fig. III, where the arrows indicate the direction of the current, and it will be seen that it is caused to traverse the entire surface of the bottom of the vat, and, reaching the flue W, is conducted through the port $w'$ in its bottom, up and over the gate $p$, carrying with it all trash and foul matter gathered in its course. I employ the flue W, as, were a simple opening at the bottom through the wall of the vat used to permit the escape of the trash, no control could be kept over the depth of water in the vat, and were the simple overflow-gate used, the trash would remain upon the floor of the vat or pond.

The partitions $g\ g\ g$, &c, may be inserted in the pond separately, or may be joined in a frame, as shown in the drawing, and be let down all together in place.

Now, having described my invention, what I claim, is—

1. In combination with sieves $b$, the receptacles B, formed substantially as shown and described, to collect and hold together the milt and spawn, for the purposes set forth.

2. In a fish tank or vat, provided with the spawn-receptacles B $b$, the tubes S, combined and arranged substantially as and for the purpose set forth.

3. In combination with a fish-vat, the overflow-pipe C, made adjustable as to height, to regulate the level of the water within the vat, substantially as shown and described.

4. In combination with a fish-vat, constructed substantially as described, the adjustable overflow-pipe C, arranged at or near the center thereof, for the purpose set forth.

5. In combination with a fish-vat, provided with the gravel-sieves $b\ b$, the removable shed, substantially as shown, and for the purpose described.

6. A fish-vat, provided with the zinc or other metal lining, which is covered with gas-tar, substantially in the manner and for the purpose shown and described.

7. In combination with a fish-vat, the series of partitions $g\ g\ g$ &c., constructed and arranged substantially as shown and described.

8. In combination with the series of partitions $g\ g\ g$, &c., the flue W, with its gate $p$ and port $w'$, in the manner and for the purpose shown and described.

AMOS BOND.

Witnesses:
SAML. F. MCFARLAND,
ROBERT VANTINE.